US 6,712,317 B1

United States Patent
Warren et al.

(10) Patent No.: US 6,712,317 B1
(45) Date of Patent: Mar. 30, 2004

(54) AERIAL CARGO CONTAINER WITH DECELERATION AND ORIENTATION ASSEMBLY

(76) Inventors: Charles V. Warren, 3600 Abernathy Dr., Fayetteville, NC (US) 28311; Charles G. Fitzgerald, 3676 Cypress Church Rd., Cameron, NC (US) 28326

( * ) Notice: Subject to any disclaimer, the term of this patent is extended or adjusted under 35 U.S.C. 154(b) by 43 days.

(21) Appl. No.: 10/252,064

(22) Filed: Sep. 18, 2002

(51) Int. Cl.[7] .................................................. B64D 1/08
(52) U.S. Cl. ..................... 244/138 R; 244/142; 244/147
(58) Field of Search ......................... 244/138 R, 142, 244/147, 148, 149, 150; 102/386

(56) References Cited

U.S. PATENT DOCUMENTS

| | | | |
|---|---|---|---|
| 2,440,293 A | | 4/1948 | Stanley |
| 3,333,643 A | | 8/1967 | Girard |
| 3,362,665 A | | 1/1968 | Larsen et al. |
| 3,497,168 A | | 2/1970 | Finney et al. |
| 3,540,684 A | | 11/1970 | Snyder |
| 3,586,257 A | * | 6/1971 | Zelinskas .................... 242/129 |
| 3,662,978 A | * | 5/1972 | Hollrock .................. 244/122 A |
| 3,838,940 A | * | 10/1974 | Hollrock .................... 416/142 |
| 4,017,043 A | * | 4/1977 | Barzda .................... 244/138 A |
| 4,131,392 A | | 12/1978 | Barzda |
| 4,379,534 A | * | 4/1983 | Miller et al. .............. 244/137.4 |
| 4,765,570 A | * | 8/1988 | Herndon ................ 244/122 AE |
| 5,232,184 A | * | 8/1993 | Reuter ......................... 244/147 |
| 5,263,663 A | * | 11/1993 | Widgery ...................... 244/148 |
| 5,309,412 A | | 5/1994 | Bourgeois |
| 5,947,419 A | * | 9/1999 | Warren et al. .......... 244/138 A |
| 6,164,594 A | | 12/2000 | Pignol et al. |

* cited by examiner

Primary Examiner—Michael J. Carone
Assistant Examiner—Daniel Matz
(74) Attorney, Agent, or Firm—MacCord Mason PLLC

(57) ABSTRACT

An aerial cargo container is described that includes a cargo box with a plurality of hinged rotor blades having a stowed position against the sides of the box and a deployed position extending outwardly from the box, and a deceleration and orientation assembly to slow the descent of the container and align the longitudinal axis of the container with the relative wind direction, thereby minimizing damage to the blades upon opening. The assembly includes a drogue chute, a blade retainer to secure the blades in the stowed position, and a folded metering cord attached between the drogue chute and the box, and a segment securing the blade retainer, whereby the cord segments unfold sequentially upon exertion of a force to slow and orient the container, prior to release of the blade retainer to permit movement of the blades to their deployed positions.

17 Claims, 4 Drawing Sheets

AERIAL CARGO CONTAINER WITH DECELERATION AND ORIENTATION ASSEMBLY

BACKGROUND OF THE INVENTION

(1) Field of the Invention

The present invention relates generally to an improved, disposable cargo container comprised of a box with extendible rotor blades that can be dropped from an aircraft to the ground, and in particular to a disposable cargo container that includes a mechanism for decelerating and orienting the container before extension of the rotor blades, thereby reducing the possibility of damage to the container.

(2) Description of the Prior Art

Numerous circumstances require the transport of various kinds of cargo to inaccessible or remote areas where ground transportation is not possible or timely. These circumstances include both military and peacetime conditions, such as providing emergency food, fuel and medical supplies to victims of natural disasters, fighting of forest fires, etc.

In many instances, the cargo can be transported to the area by helicopter, or dropped from an airplane with a parachute. However, helicopters are not always readily available, and are expensive to operate. Parachutes are also expensive, particularly when used to drop relatively small quantities of cargo, and are usually not recoverable due to the terrain and the conditions under which the cargo is dropped.

Various prior art patents since at least as early as the 1940s have proposed an alternative means involving the dropping of containers of small cargo loads from an aircraft without a parachute. Instead, the container is constructed of a disposable box with attached wings or rotor blades that extend outwardly when the box is dropped from an aircraft. The force of the air against the lower surface of these blades causes the blades to turn in the direction of their leading edges, rotating the attached box and creating lift to slow the container's descent.

This alternative transport means, while conceptually addressing the need for inexpensive cargo delivery, has apparently found no significant application. This lack of use is believed to be attributable to two somewhat related reasons; cost effectiveness and durability.

A disposable aerial cargo container that addresses these prior art deficiencies, i.e., a container that can be manufactured at an acceptable cost while still having the required strength and durability necessary for transportation of cargo loads of up to about sixty (60) pounds or more under adverse conditions without significant damage to the cargo upon impact with the ground is described in U.S. Pat. No. 5,947,419, issued Sep. 7, 1999 to Warren et al., and incorporated herein by reference.

The Warren et al. container, like prior art containers, is comprised of a box for holding the cargo to be transported, and a plurality of wings or rotor blades having hinged roots, with the blades being deployable to a substantially horizontal attitude when the container is dropped from the aircraft. As with prior art containers, air pressure against the rotor blades causes the box to rotate and creates aerodynamic lift to slow the descent of the container. The preferred Warren et al. container includes a cargo box with a hexagonal cross-section comprised of a continuous side wall formed of six rectangular attached facets that are positioned in a hexagonal configuration, and a hexagonal end wall closing one end of the box formed by the side wall material. The open end of the container is closed with a hexagonal shaped plug type lid to enclose the cavity. Alternatively, both ends of the box can be closed and the plug placed inside the box to act as a crushable or frangible cushion of landing. The box walls, for purposes of disposability and economy, are preferably formed of corrugated paper or hardboard.

The preferred Warren et al. container includes six side panels with three or more rotor blades, one blade adjacent to every other panel depending on the number of blades used. When the container is stowed, the rotor blades are folded against the side panels and, when deployed, extend outward from the box in a substantially horizontal plane substantially perpendicular to the side panels. In order to achieve maximum lift, while still being easy to store, the blades preferably have length and width dimensions approximating the corresponding dimensions of the side panels.

While the rotor blades may be hinged at their root to one panel or side of the container box, there is a risk of separation of one or more rotors during flight, causing the container to plummet to the ground, damaging the cargo. In the Warren et al. invention, this deficiency is addressed by the use of a separate rotor blade hub positioned at the closed (upper) end of the box, with the rotor blades being hinged at their roots to the hub, instead of directly to the box. Preferably, the hub is in the shape of a metal wire or composite material frame that extends over the top and upper edges of the box. The rotor hinge points on the hub are located on the support adjacent alternating or sequential box panels, with hinge pins being used to attach the rotor blades to the hinge points of the hub. Thus, the centrifugal force exerted by the blades act upon each other through the hub and not the box. Preferably, the hub includes a common central point with connections from the central point to each of the hinge points. With this arrangement, the rotor blade's centrifugal forces tend to act against each other to negate the stresses and loads on the box.

Upward movement of the blades during deployment and flight is limited by tethers and shock cords having their upper ends attached to the blades and their lower ends attached at the lid (lower) end of the box. The tethers may be resilient, such as a bungee cord, or a non-resilient cord of a material such as nylon. Since the tethers are also subjected to high forces, particularly during deployment, the box preferably includes a tether attachment frame that extends across the bottom wall (lid). This tether attachment frame includes attachment points to secure the lower end of each tether approximately beneath the rotor blade to which the upper end of the tether is attached. For example, the attachment frame can be in the shape of an equilateral triangle having apexes that extend beyond the periphery of the box under the alternating panel over which the panels are positioned, with one tether being attached at each apex of the triangle. Alternatively, a hub similar to the rotor hub can be placed on the bottom of the container to protect the box during handling and serve as a multiple (up to six) attach points for the tethers for all the blades.

Unlike earlier prior art rotor blades of metal or wood, the Warren et al. rotor blades are made from a planar piece of corrugated paper or polymer, either in the form of a single corrugated material sheet or a plurality of segments joined in a particular manner to provide the needed structural integrity under incurred aerodynamic and centrifugal loading, while maintaining the required economy. Each rotor blade is comprised of a lower facet, and a multi-facet upper panel with a multi-faceted forward section, a rotor spar of wood or other material, and a generally planar rear section secured to the lower panel to form an integral aerodynamically-shaped blade.

When loaded, the rotor blades are held against their respective box facets by a blade restraining strap. At the drop zone, the box is pushed from the aircraft with a static line or other means removing the blade-restraining strap. The relative wind around the box causes a lifting force to deploy the rotor blades which rotate about their hinge attach points and are snubbed by the tethers and the shock cords. The blades will be limited to a substantially horizontal orientation, i.e. plus or minus ten (10) degrees of horizontal by the tethers. In turn, the tether attach frame absorbs the tension in the tethers instead of the box. The force of the air against the lower facet of the blades, with the leading edges of the blades being lower than their trailing edges, causes the container to rotate in the direction of the leading edges, and accelerate rotationally until it achieves rotational terminal velocity, generating maximum aerodynamic lift, thereby slowing the box to its terminal vertical velocity.

While the Warren et al. cargo container is a significant improvement over prior art containers, there is still a risk of damage to the container and its contents when the container is released from the aircraft, particularly with heavy and asymmetrical loads or when the container is being deployed in high relative winds (airspeeds). As noted above, the rotor blades in the Warren et al. container are released for movement to their deployed or extended position from their stowed position as the container is released from the aircraft. As a result, the blades extend while the container is dropping rapidly, exerting considerable force on the blades and the hinged attach points. After the blades are fully extended and the container is rotating, the container will orient so that an equal force is exerted on all blades. However, when the container is dropped from a moving aircraft, the orientation of the container may be such that unequal blade forces are exerted. These unequal forces, particularly if the container is moving at a high rate of speed, may cause damage to one or more rotor blades, or prohibit their deployment.

Thus, the utility of containers constructed similar to the Warren et al. container, would be considerably enhanced, and the risk of damage decreased, if the container could be oriented and its descent slowed prior to deployment of the rotor blades. By slowing the container prior to blade deployment, the container will be farther away from the drop aircraft, insuring that the container is not struck by the aircraft.

SUMMARY OF THE INVENTION

In general, the desired results of the present invention are achieved by adding a deceleration and orientation assembly, also referred to herein as a delay assembly for brevity, as described herein in detail, to cargo containers of the type that include a cargo box with hinged blades having a stowed position against the box and a deployed position extending outwardly from the box.

The delay assembly of the present invention is generally comprised of an air resistance device, such as a drogue chute; a blade retainer adapted to secure the rotor blades in their stowed position; and a folded metering cord that has one end attached to the resistance device, an opposed end attached to the top of the container, and a segment attached to the blade retainer. Preferably, the metering cord includes a plurality of folds that are adapted to unfold in sequence.

When loading the container, the bottom cage or hub with the respective blade tethers and rotor blades attached is placed on the floor. The box is inserted into the bottom cage in its hexagonal shape and the frangible plug is inserted into the box. The payload is placed in the box on top of the plug and secured in the center of the box with packing and dunnage. The top wall of the box is closed and the rotor hub cage is placed over the top of the box. The top and bottom hubs are strapped together to maintain their relative position with each other with the box in between them. The rotor blades are then pinned in place to the rotor hinge clips on the upper hub and secured. The delay assembly and blade retaining strap is then attached and secured for transport to the aircraft for launch.

When the cargo container is discharged from the aircraft, the drogue chute or other drag device, e.g., a streamer, exerts a drag due to wind resistance, creating tension on the metering cord, sequentially opening folds of the cord, thereby slowing the descent of the container. At the same time the cord tension orients the container so that its axis is aligned with the wind direction. Following deceleration and orientation, the blade retainer is released permitting the rotor blades to open to their extended position. Since the container is moving at a slower speed, and since the force of the air is approximately equal against all of the blades, all rotor blades will deploy. Thus, the risk of damage is substantially reduced.

In a preferred embodiment, the metering cord is folded into an a plurality if S-type folds, with the folds being secured by thread that has a breaking strength below the force exerted on the metering cord during deceleration, e.g., about 15 pounds force to about 30 pounds force. The number of thread loops securing the folds is equal to twice the number of folds, with the upper or outer fold being engaged by one thread loop and each half sequential fold being engaged by a one additional thread loop. The lower fold, used to secure the blade retainer is sewn with all thread loops and therefore the last to break.

When a force exceeding the breaking strength of the thread is exerted on the cord, the single loop holding the outer fold is broken, allowing the outer fold to open. As a result, a brief drop in restraining force against the container is followed by an increased force, or tug, acting to decelerate and orient the container. The continuing force on the cord then causes the second loop to break, allowing the next fold to open with a similar effect. This sequence continues until the final thread holding the lower elongated fold is broken, resulting in pulling of the elongated fold from the blade retainer, and permitting the blades to open.

DETAILED DESCRIPTION OF THE INVENTION

Figure 1:
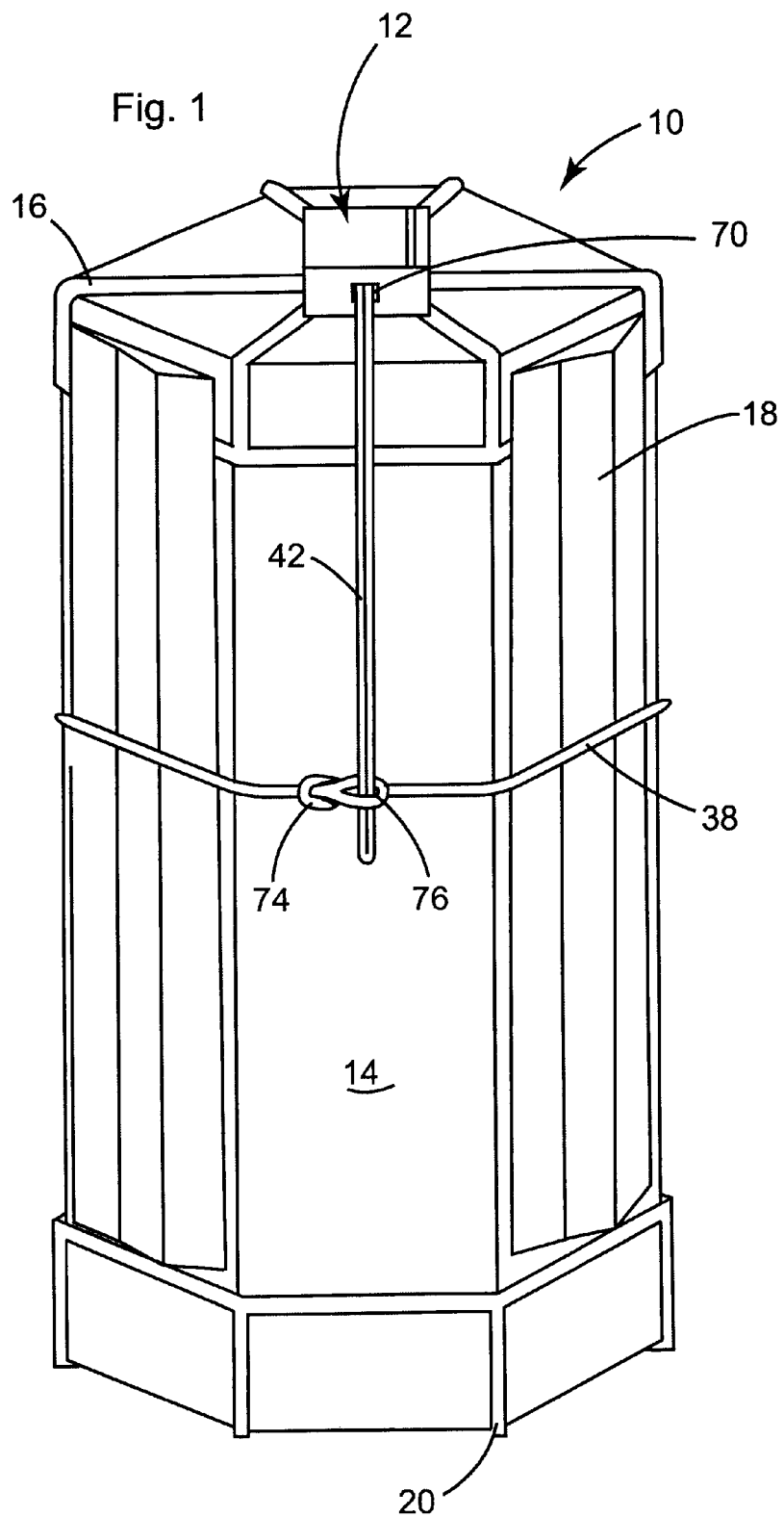
FIG. 1 is a perspective view of a cargo container with the metering assembly.
Figure 2:
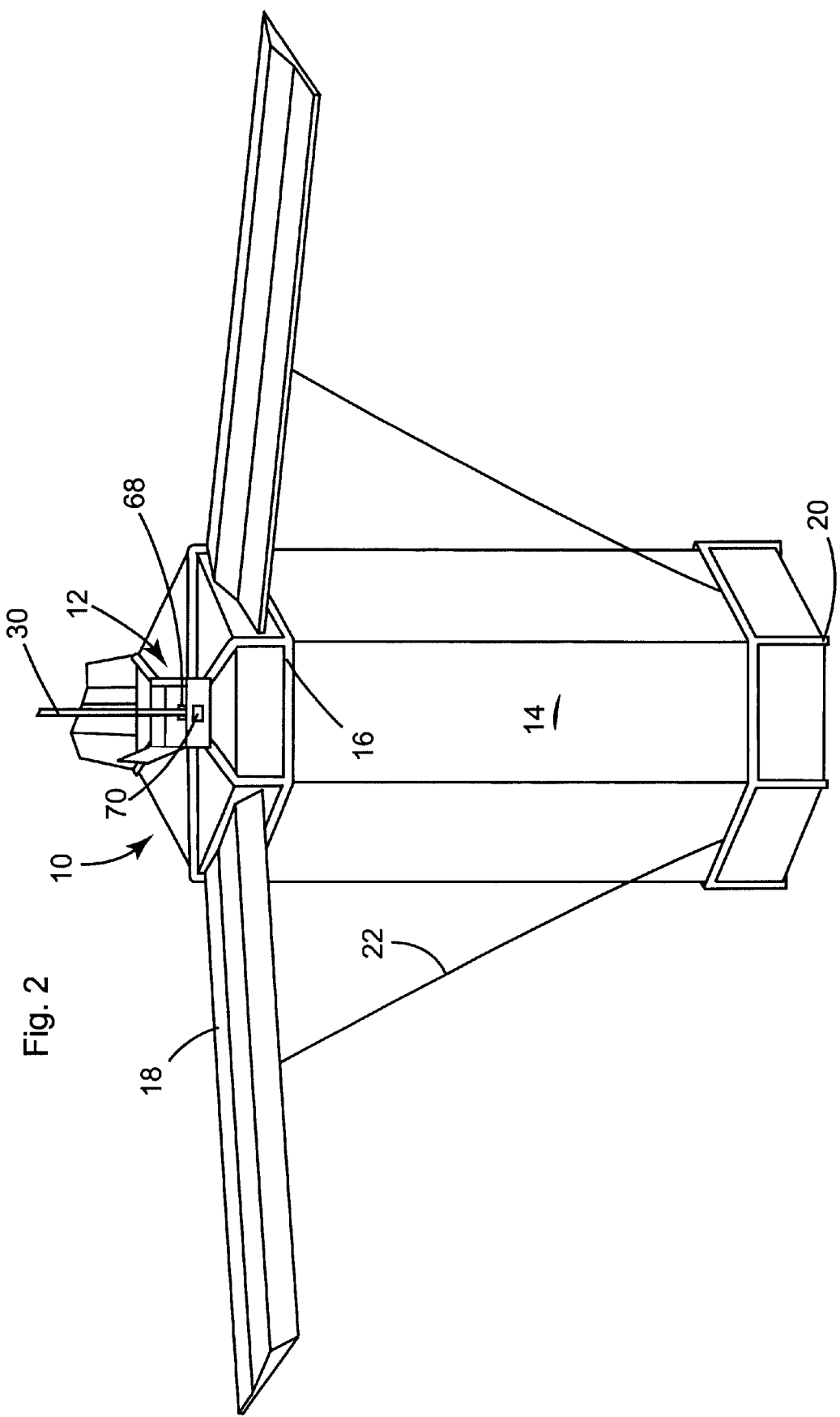
FIG. 2 is perspective view of the upper end of a deployed cargo container illustrating the open housing and extended cord.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

The preferred embodiment of the present invention will be described in the context of the Warren et al. container discussed above. It will be understood, however, that the delay assembly can also be used with other cargo containers, as well as with other items that are deployed aerially without a parachute in lieu of static line systems now in use.

As best shown in the drawings, a preferred embodiment of the invention is comprised of a cargo container, generally 10, having a delay assembly, generally 12, positioned on the top of container 10. Container 10 is comprised of a box 14 formed of six rectangular side panels joined at their abutting edges to from a continuous sidewall, a rotor hub 16 formed of a lightweight welded wire or extruded plastic cage, three rotor blades 18, a lower hub 20 similar in construction to hub 16, and strut tethers 22 joining blades 18 to hub 20. Blades 18 are hinged at their roots to hub 16 with hinge pins 24. In order for the box to rotate and create aerodynamic lift, the chord line of each rotor blade is set at a negative angle of incidence from a horizontal line that is parallel to the end cap 22. This angle creates rotative forces that spin the entire assembly. Different airfoil shapes may need different angles of attack. For example, the angle of incidence may be between minus four (−4) and minus six (−6) degrees. Tethers 22 extend from tether frame 20 to approximately the midspan of each rotor blade 18.

Figure 3:
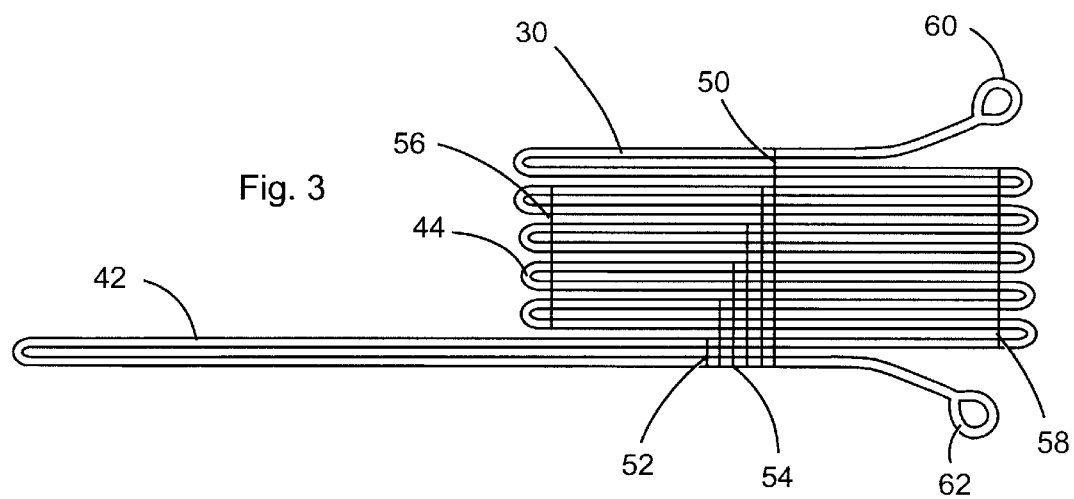
FIG. 3 is a sectional side view of a folded and tied metering cord.

Delay assembly 12 is comprised of a flexible metering cord 30 that is folded as shown in FIG. 3 prior to deployment and held in the folded condition by breakable threads 32, a drogue chute 34, and a housing 36, which may be a cardboard box, to enclose cord 30 and chute 34 prior to deployment. Blade retainer 38 is stretched around box 14 and blades 18 and secured by a segment of cord 30. Cord 30 is formed of a flexible material, such as nylon webbing or a nylon cord that will not break under the conditions of use. Cord 30 will normally have a length of from about 15 feet to about 30 feet for use with most containers.

As best illustrated in FIG. 3, cord 30 is initially folded into a plurality of folds, i.e., an outer fold 40; an elongated inner fold 42, which serves to secure blade retainer 38; and one or more intermediate folds 44 between folds 40 and 42. For ease of packing, and to facilitate a uniform deployment, outer fold 40 and intermediate folds 44 are generally of the same size, while inner fold 42 will be of a length sufficient to engage blade retainer 38. For purposes of discussion, it will be understood that each "fold" is formed of two adjacent, overlapping cord segments.

As will be discussed in greater detail hereinafter, it is desirable for the cord folds to open sequentially during deployment, with outer fold 40 opening first, followed by each intermediate fold 44 beginning with the intermediate fold closest to outer fold 40, and finally inner fold 42. To achieve this sequential opening, the folds are joined by a plurality of thread loops that will break when subjected to the forces of deployment. Specifically, an outer thread loop 50 joins all of the folds together. An inner thread loop 52 joins only the segments of inner fold 42, and intermediate thread loops 54 join each intermediate fold 44 to lower fold 42 and all folds between the particular intermediate fold and the lower fold. Supplemental breakable threads 56 and 58 may be used to secure the outer ends of folded cord 30 until deployment. By duplicating the thread stitch pattern from the inner fold to the outer fold loop pattern, additional break points can be used to increase the amount of brake tugs imparted to the container, thereby slowing down the container prior to lade deployment.

Thus, the folds open sequentially when a pulling force is exerted between the ends of cord 30, beginning with outer fold 40. That is, outer thread loop 50 initially breaks, since thread loop 50 is the only thread loop securing outer fold 40. Then, since fold 44 is secured by only one thread loop, the thread loop 54 breaks. This sequential breakage and extension of cord 30 continues until inner thread loop 52 is broken, allowing inner fold 42 to be pulled from blade retainer 38.

Outer end 60 of cord 30 is attached to a drag device, such as drogue chute 34, with inner end 62 being attached to the top of cargo container 10, e.g., at the center of rotor hub 16. Folded cord 30 and drogue chute 34 are packaged within housing 36. Housing 36 includes an first or upper access opening 66 to permit removal of drogue chute 34 and cord 30, a second or bottom access opening 68 that is opened to withdraw inner end 52 of cord 30 for attachment to hub 16, and a third or side access opening 70 to withdraw inner loop 42 to secure blade retainer 38. Each opening may be covered by a flap or other cover prior to use.

Figure 4:
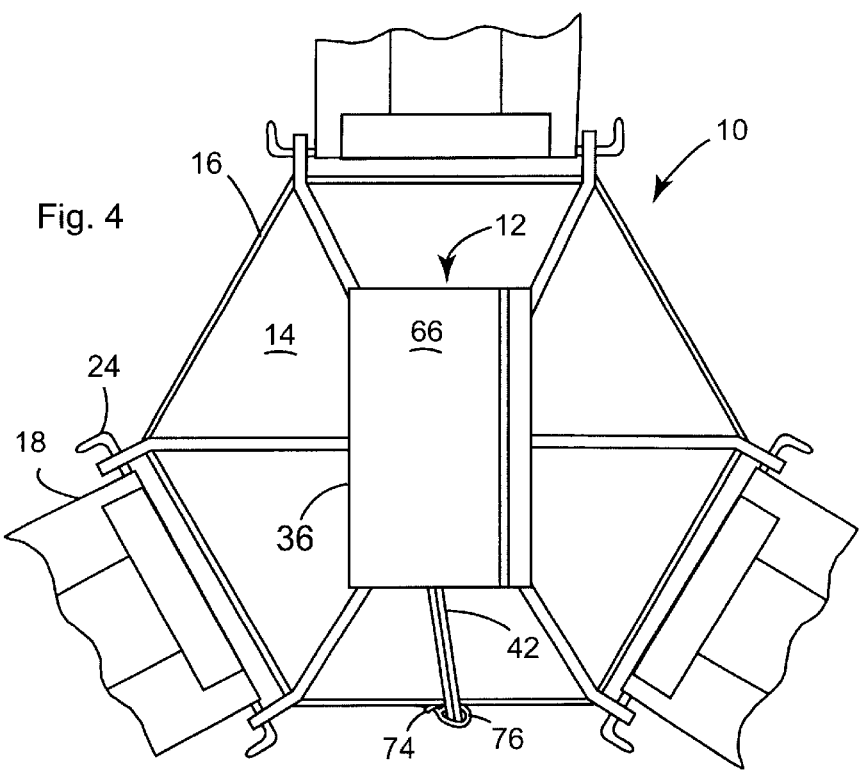
FIG. 4 is a top view of a cargo container illustrating attachment of the cord to the hub.
Figure 5:
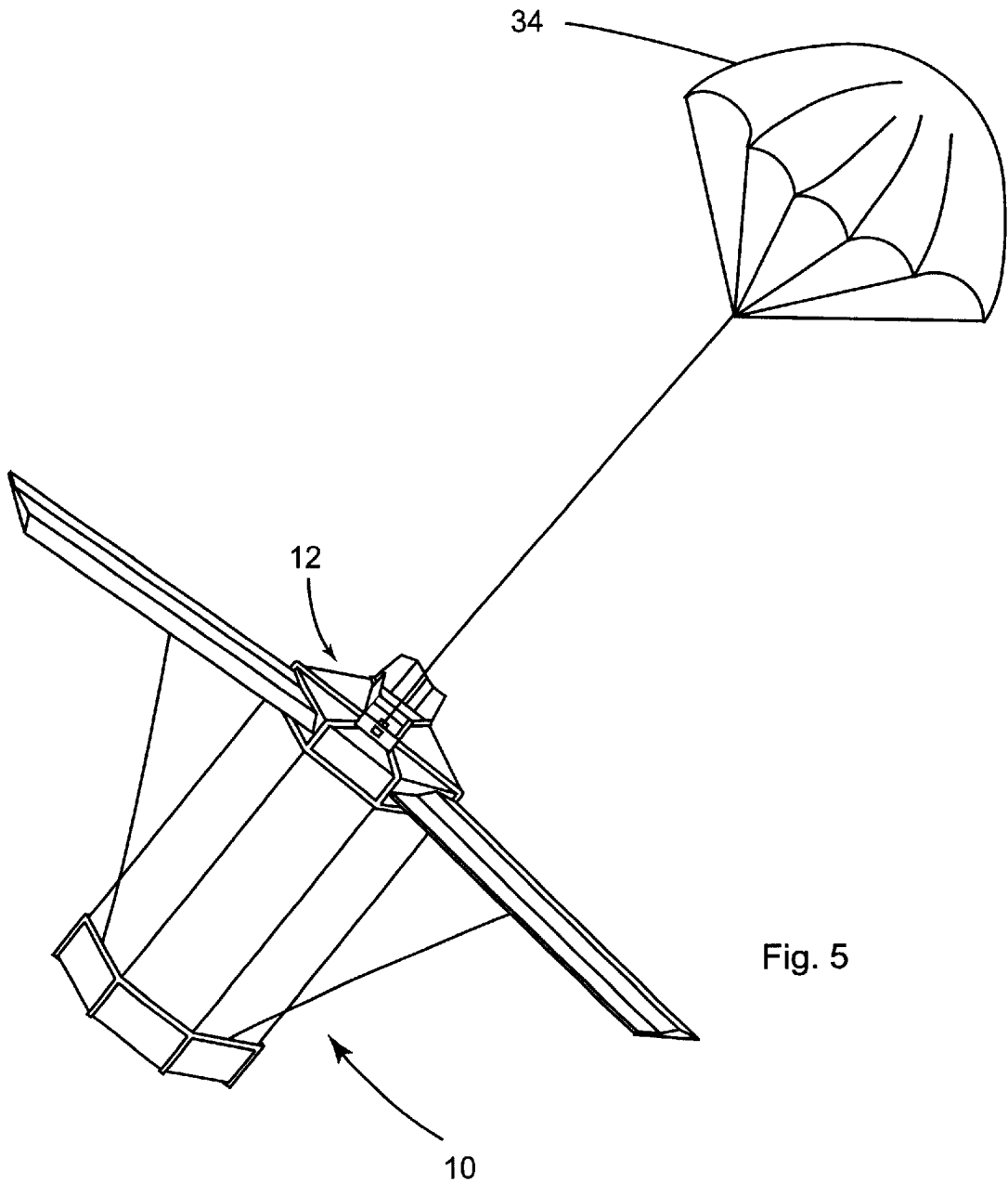
FIG. 5 is a perspective view of the deployed container during descent with the attached drogue chute.

Blade retainer 38 in the preferred embodiment is comprised of a stretchable band or strap, e.g., a bungee cord that is stretched around box 14 and all blades 18 to secure blades 18 in a stowed position against the sides of box 14. The ends of retainer 38 are held together by inner fold 42. For example, as illustrated in FIG. 4, the opposed ends of retainer 38 may include closed loops 74 and 76, with loop 74 being inserted through loop 76 and the end of inner fold 42 being inserted through loop 74.

When cargo container 10 is to be dropped from an aircraft, the operator opens the flap or lid covering opening 66 of housing 36 and removes chute 34. Container 10 is then pushed or thrown from the aircraft. To ensure opening, chute 34 may be briefly held by the operator or by a breakable static line. As container 10 begins to fall, the force of air resulting from the forward and downward movement of container 10 opens chute 34, causing a force to about 30 pounds or more to be exerted on cord 30, causing folds 40, 44 and 42 of cord 30 to sequentially open. Each loop break meters the stowed cord and imparts a pull to decelerate and orient container 10 so that the longitudinal axis of container 10 aligns with the direction of movement. Finally, thread loop 52 securing inner fold 42 is broken, resulting in inner fold 42 being pulled from blade retraining strap 38. As a result, blades 18 are released to move outwardly to their extended positions. Thus, when blades 18 extend, the speed of container 10 has become oriented at the correct attitude and its descent slowed. Therefore, an equal and reduced force is exerted on all blades, significantly reducing the possibility of damage on one or more of the blades.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A deceleration and orientation assembly for an aerial cargo container comprised of a cargo box with an upper end and a plurality of rotor blades hinged adjacent said cargo box upper end, said blades having a stowed position against said box and a deployed position extending outwardly from said box in a generally horizontal plane, said blades being rotatable with said box, said assembly comprising:

a) an air resistance device;
   b) a blade retainer adapted to secure said blades in the stowed position;
   c) a metering cord including a plurality of folded segments having a first end attached to said air resistance device and an opposed end attached to the upper end of said box, a portion of said cord securing said blade retainer, whereby said cord segments unfold sequentially upon exertion of a force between said air resistance device and said container to slow and orient said container, said blade retainer thereafter being released to permit said blades to move to their extended positions; and d) a housing to enclose said air resistance device and cord, said housing having a first opening for removing said chute and said cord, a second opening for attaching said cord to said container, and a third opening for attaching said cord to said blade retainer.

2. The assembly of claim 1, wherein said blade retainer is a stretchable cable or strap adapted to extend around said box and said blades when said blades are in the stowed position.

3. The assembly of claim 1, wherein said air resistance device is a drogue chute or streamer.

4. The assembly of claim 1, further including breakable thread loops securing said cord segments together, whereby tension exerted on said cord sequentially releases said segments and thereafter detaches said metering cord from said blade retainer.

5. A deceleration and orientation assembly for an aerial cargo container comprised of a cargo box with an upper end and a plurality of rotor blades hinged adjacent said cargo box upper end, said blades having a stowed position against said box and a deployed position extending outwardly from said box in a generally horizontal plane, said blades being rotatable with said box, said assembly comprising:

a) a drogue chute;
   b) a retractable blade retainer to encircle said box and blades to secure said blades in the stowed position;
   c) a metering cord with a plurality of adjacent folded segments, a first end attachable to said drogue chute and an opposed end attachable to the upper end of said box, and an elongated folded segment to secure said blade retainer around said box and blades;
   d) a breakable thread securing said cord folded segments together, whereby tension exerted on said cord sequentially releases said cord segments and thereafter detaches said metering cord from said blade retainer; and
   e) a housing to enclose said drogue chute and cord, said housing having a first opening for removing said chute and said cord, a second opening for attaching said cord to said container, and a third opening for attaching said cord to said blade retainer.

6. The assembly of claim 5, wherein said cord includes an outer folded segment, an elongated folded segment, and a plurality of intermediate folded segments between said outer folded segment and said elongated folded segment, said breakable thread including a first thread loop securing all of said cord segments together, a second thread loop securing said elongated segment, and intermediate thread loops securing each of said intermediate cord segments to said elongated segment and any other intermediate cord segments between said intermediate cord segment and said elongated cord segment.

7. The assembly of claim 6, wherein said outer and intermediate folded cord segments are of approximately equal length and have outer ends, said breakable thread securing said segments approximately equidistant between said outer ends.

8. The assembly of claim 5, wherein blade retainer includes a first looped end and a second looped end, said second looped end being inserted through said first looped end, and said elongated cord segment being inserted through said second looped end.

9. The assembly of claim 5, wherein said breakable thread has a breaking strength of from about 15 to about 30 pounds force.

10. An aerial cargo container comprising:

a) a cargo box having an upper end;
   b) a plurality of rotor blades having aerodynamic camber, leading and trailing edges, and roots hinged to adjacent said cargo box upper end, said blades having a stowed position against said box and a deployed position extending outwardly from said box in a generally horizontal plane, said blades being rotatable with said hub and said box;
   c) an air resistance device;
   d) a blade retainer securing said blades in the stowed position;
   e) a metering cord including a plurality of folded segments having a first end attached to said air resistance device and an opposed end attached to the upper end of said box, a portion of said cord securing said blade retainer, whereby said cord segments unfold sequentially upon exertion of a force between said air resistance device and said container to slow and orient said container, said blade retainer thereafter being released to permit said blades to move to their extended positions; and
   f) a housing to enclose said air resistance device and cord, said housing having a first opening for removing said chute and said cord, a second opening for attaching said cord to said container, and a third opening for attaching said cord to said blade retainer.

11. The container of claim 10, wherein said blade retainer is a stretchable cable or strap extending around said box and said blades when said blades are in the stowed position.

12. The container of claim 10, further including a housing enclosing said air resistance device and said cord.

13. The container of claim 10, wherein said air resistance device is a drogue chute or streamer.

14. The container of claim 10, further including breakable thread loops securing said cord segments together, whereby tension exerted on said cord sequentially releases said segments and thereafter detaches said metering cord from said blade retainer.

15. An aerial cargo container comprising:

a) a cargo box having an upper end;
   b) a plurality of rotor blades having aerodynamic camber, leading and trailing edges, and roots hinged to adjacent said cargo box upper end, said blades having a stowed position against said box and a deployed position extending outwardly from said box in a generally horizontal plane, said blades being rotatable with said hub and said box;
   c) a drogue chute;
   d) a stretchable blade retainer to encircle said box and blades to secure said blades in the stowed position;
   e) a metering cord with a plurality of adjacent folded segments, a first end attachable to said drogue chute and an opposed end attachable to the upper end of said box, and an elongated folded segment to secure said blade retainer around said box and blades; and
   f) a breakable thread securing said cord folded segments together, whereby tension exerted on said cord sequentially releases said cord segments and thereafter detaches said metering cord from said blade retainer; and g) a housing to enclose said drogue chute and cord, said housing having a first opening for removing said chute and said cord, a second opening for attaching said cord to said container, and a third opening for attaching said cord to said blade retainer.

16. The container of claim 15, wherein said cord includes an outer folded segment, an elongated folded segment, and a plurality of intermediate folded segments between said outer folded segment and said elongated folded segment, said breakable thread including a first thread loop securing all of said cord segments together, a second thread loop securing said elongated segment, and intermediate thread loops securing each of said intermediate cord segments to said elongated segment and any other intermediate cord segments between said intermediate cord segment and said elongated cord segment.

17. The container of claim 16, wherein said outer and intermediate cord segments are of approximately equal length and have outer ends, said breakable thread securing said segments approximately equidistant between said outer ends.

* * * * *